United States Patent
Le Magoarou et al.

(10) Patent No.: US 11,985,018 B2
(45) Date of Patent: May 14, 2024

(54) METHOD AND DEVICE FOR DETERMINING A PILOT SEQUENCE, ASSOCIATED METHOD FOR ESTIMATING A CHANNEL AND COMPUTER PROGRAM

(71) Applicant: FONDATION B-COM, Cesson Sevigne (FR)

(72) Inventors: Luc Le Magoarou, Rennes (FR); Stéphane Paquelet, Rennes (FR)

(73) Assignee: FONDATION B-COM, Cesson Sevigne (FR)

( * ) Notice: Subject to any disclaimer, the term of this patent is extended or adjusted under 35 U.S.C. 154(b) by 18 days.

(21) Appl. No.: 17/797,902

(22) PCT Filed: Feb. 2, 2021

(86) PCT No.: PCT/EP2021/052368
§ 371 (c)(1),
(2) Date: Aug. 5, 2022

(87) PCT Pub. No.: WO2021/156225
PCT Pub. Date: Aug. 12, 2021

(65) Prior Publication Data
US 2023/0057413 A1   Feb. 23, 2023

(30) Foreign Application Priority Data
Feb. 7, 2020   (FR) ........................... 2001219

(51) Int. Cl.
*H04L 27/26* (2006.01)
*H04L 25/02* (2006.01)

(52) U.S. Cl.
CPC ...... *H04L 27/2613* (2013.01); *H04L 25/0226* (2013.01)

(58) Field of Classification Search
CPC .................. H04L 27/2613; H04L 25/0226
See application file for complete search history.

(56) References Cited

U.S. PATENT DOCUMENTS

2018/0227021 A1* 8/2018 Ketchum ............. H04B 7/0854

OTHER PUBLICATIONS

Minn, H. et al., "Optimal periodic training signal for frequency offset estimation in frequency selective fading channels" 2004 IEEE International Conference On Communications; ICC 2004; Jun. 20-24, 2004, Paris, IEEE Operations Center, Piscataway, NJ, USA, vol. 1, pp. 488-492 [Submission Pending].

(Continued)

*Primary Examiner* — Rahel Guarino
(74) *Attorney, Agent, or Firm* — NIXON & VANDERHYE

(57) ABSTRACT

A pilot sequence includes pilot vectors to be transmitted in a communication channel. A method of determining the pilot sequence comprises determining an orthogonal basis of a real vector space that is an image of a matrix having, respectively as columns, the partial derivatives of the model vector with respect to the different real parameters; and constructing the pilot vectors using the determined orthogonal basis, by grouping the orthogonal vectors of the orthogonal basis in at least one pair and by producing, for each of the at least one pair comprising a first vector and a second vector, a pilot vector by summation of the first vector and a product of the second vector by an imaginary number.

16 Claims, 2 Drawing Sheets

(56) References Cited

OTHER PUBLICATIONS

Wen, Z. et al., "Optimal Pilot Design for MIMO Broadcasting Systems Based on the Positive Definite Matrix Manifold" Aug. 2, 2019, IEEE Access, vol. 7, pp. 99589-99601 [Submission Pending].
Amr, E. et al., "On Training Sequence Optimization for Leaked MIMO OFDM Channels" Dec. 9, 2019, A 2019 IEEE Global Communications Conference (GLOBECOM), IEEE, pp. 1-6 [Submission Pending].
Sezinger Set et al., "CramER-Rao Bound and Training Sequence Selection for MimoOfdma Transmissions Impaired by Frequency Offsets" Jan. 1, 2006, Acoustics, Speech and Signal Processing, 2006. ICASSP 2006 Proceedings. 2006 IEEE International Conference on Toulouse, France May 14-19, 2006, Piscataway, NJ, USA,IEEE, Piscataway, NJ, USA, pp. IV-IV [Submission Pending].
Xie, H. et al., "A Unified Transmission Strategy for TDD/FDD Massive MIMO Systems with Spatial Basis Expansion Model" 2016. Transactions on Vehicular Technology. 2016 IEEE. (14 pages).
El Ayach, O. et al., "Spatially Sparse Precoding in Millimeter Wave MIMO Systems" May 11, 2013. 2012 IEEE International Communications Conference (ICC). (30 pages).
Bajwa, W. et al "Compressed Channel Sensing: A New Approach to Estimating Sparse Multipath Channels" Apr. 20, 2009, Submitted to Proceedings of the IEEE (25 pages).
International Search Report for PCT/EP2021/052368, dated Feb. 2, 2021, with English Translation (5 pages).
Written Opinion of the ISA for PCT/EP2021/052368, dated Feb. 2, 2021 (5 pages).

* cited by examiner

METHOD AND DEVICE FOR DETERMINING A PILOT SEQUENCE, ASSOCIATED METHOD FOR ESTIMATING A CHANNEL AND COMPUTER PROGRAM

This application is the U.S. national phase of International Application No. PCT/EP2021/052368 filed Feb. 2, 2021 which designated the U.S. and claims priority to FR 2001219 filed Feb. 7, 2020, the entire contents of each of which are hereby incorporated by reference.

TECHNICAL FIELD OF THE INVENTION

The present invention relates to the technical field of telecommunications.

The present invention relates in particular to a method and a device for determining a pilot sequence, as well as an associated method of channel estimation and an associated computer program.

STATE OF THE ART

In order to optimize the transmission of data in a communication channel, it is known to implement beforehand a channel estimation method comprising the transmission of pilot sequences in the communication channel.

By processing the received pilot sequences, it is possible to have a better knowledge of the current state of the communication channel and thus for example to adapt the way in which the data are transmitted in order to obtain an optimal transmission.

PRESENTATION OF THE INVENTION

In this context, the present invention provides a method of determining a pilot sequence comprising a plurality of pilot vectors to be transmitted in a communication channel modeled by a model vector comprising at least one complex-valued function which is variable as a function of a plurality of real parameters and is descriptive of a transmission from a transmitting antenna to a receiving antenna through the communication channel, the method being characterized in that it comprises the following steps:
  determination of an orthogonal basis of a real vector space that is the image of a matrix having respectively as columns the partial derivatives of the model vector with respect to the various real parameters;
  construction of the pilot vectors by means of the determined orthogonal basis, by grouping the orthogonal vectors of the orthogonal basis in pairs and by producing, for each pair comprising a first vector and a second vector, a pilot vector by summation of the first vector and the product of the second vector by an imaginary number.

As explained below, the pilot vectors thus obtained are optimal for any unbiased estimator and can thus be advantageously used for estimating the communication channel.

In certain embodiments, the method may comprise a step of determining at least one of the elements of said matrix on the basis of at least one previously determined value of one of said parameters and representing the current state of the communication channel.

According to the embodiment described below, said matrix comprises a number of rows equal to the number of elements forming the model vector, and a number of columns equal to the number of parameters in the plurality of parameters, and any element in row p and in column q in said matrix is equal to the value taken, for values of parameters representing the current state of the communication channel, by the partial derivative, with respect to the $q^{th}$ parameter of the plurality of parameters, of the function situated in the $p^{th}$ position in the model vector.

In practice, the step of determining said orthogonal basis may for example comprise a step of factoring said matrix in the form of the product of an R-orthogonal matrix U and an upper triangular matrix with real values.

The step of determining said orthogonal basis can then comprise the construction of a matrix Q whose columns form a basis of eigenvectors for the matrix $-\text{Im}\{U^H U\}^2$, and the calculation of the product (noted for example V) of the matrix U and the matrix Q.

The matrix V thus obtained then presents in columns vectors forming the desired orthogonal basis.

The step of determining said orthogonal basis may also comprise the determination of at least one coefficient equal to the square root of an eigenvalue of the matrix $-\text{Im}\{U^H U\}^2$; the step of constructing said pilot vectors can then use said coefficient to produce one of said pilot vectors; this coefficient is used here in the calculation of the scalar (or real number) to be applied (by multiplication) to the aforementioned summation to obtain the concerned pilot vector.

Provision can also be made for the step of constructing the pilot vectors to include, if the number of orthogonal vectors in said orthogonal basis is odd, the production of a pilot vector collinear with one of said orthogonal vectors.

In certain embodiments, said function is non-linear with respect to at least one parameter among said real parameters.

In an exemplary implementation described below, the model vector is the product of a complex gain and a steering vector that is variable as a function of an angle identifying the position of the receiving antenna relative to the transmitting antenna; in this example, said real parameters are the real part of the complex gain, the imaginary part of the complex gain and said angle.

Provision can also be made for the different elements of the model vector to be different complex-valued functions that are variable as a function of the plurality of real parameters and that are descriptive respectively of transmissions between distinct transmitting antenna-receiving antenna pairs.

The invention also provides a channel estimation method between a transmitter and a receiver, comprising:
  a step of determining pilot vectors in accordance with the method present above; and
  a step of transmitting the determined pilot vectors in the communication channel.

The receiver can then receive the transmitted pilot vectors and determine channel state data based on the received pilot vectors.

This channel state data can then be transmitted from the receiver to the transmitter; the transmitter can then estimate at least one value of a parameter of the channel model based on the channel state data.

Precoding modules of the transmitter can be configured accordingly, that is to say according to said at least one estimated value of the parameter of the channel model.

The invention also provides a device for determining a pilot sequence comprising a plurality of pilot vectors to be transmitted in a communication channel modeled by a model vector comprising at least one complex-valued function which is variable as a function of a plurality of real parameters and is descriptive of a transmission from a transmitting antenna to a receiving antenna through the communication channel, characterized in that it is programmed for:

determining an orthogonal basis of a real vector space that is the image of a matrix having respectively as columns the partial derivatives of the model vector with respect to the different real parameters;

building the pilot vectors by means of the determined orthogonal basis, by grouping the orthogonal vectors of the orthogonal basis in pairs and by producing, for each pair comprising a first vector and a second vector, a pilot vector by summation of the first vector and the product of the second vector by an imaginary number.

The invention finally provides a computer program comprising instructions for implementing a pilot sequence determination and/or channel estimation method as proposed above when these instructions are executed by a processor.

Of course, the different characteristics, variants and embodiments of the invention can be associated with each other in various combinations insofar as they are not incompatible or exclusive of each other.

DETAILED DESCRIPTION OF THE INVENTION

In addition, various other characteristics of the invention emerge from the appended description made with reference to the drawings which illustrate non-limiting implementation forms of the invention and where:

FIG. 1 represents a telecommunications system comprising a set of Nt transmitting antennas $T_1, \ldots, T_{Nt}$ and a set of Nr receiving antennas $R_1, \ldots, R_{Nr}$.

Figure 1:
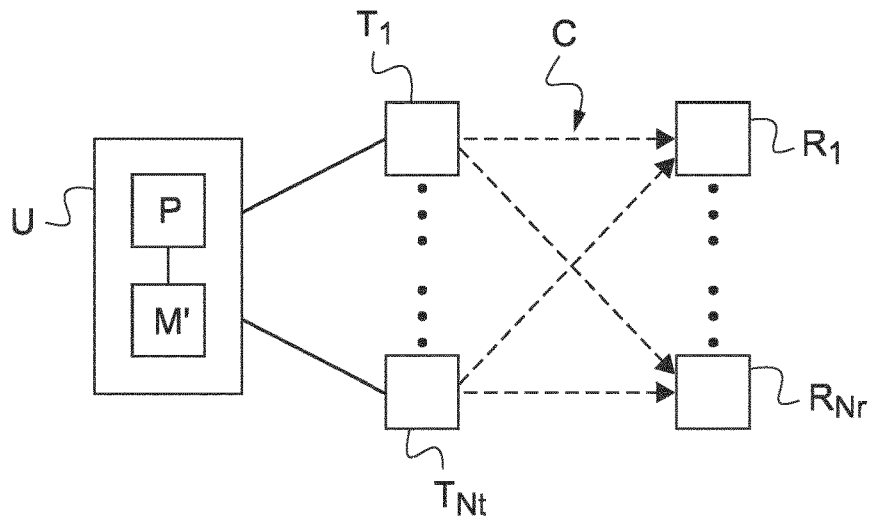
FIG. 1 shows a possible context of implementation of the invention.

Each one of the transmission antennas $T_1, \ldots, T_{Nt}$ transmits electromagnetic signals (generally representing data to be transmitted, coded by symbols) in a communication channel C, where these signals are received by the various reception antennas $R_1, \ldots, R_{Nr}$.

This situation corresponds in particular to the case of so-called "MIMO" systems (for "Multiple-Input Multiple-Output") which comprise a plurality of transmission antennas $T_1, \ldots, T_{Nt}$ and a plurality of reception antennas $R_1, \ldots, R_{Nr}$.

In certain applications, the various antennas (whether in transmission or in reception) are connected to the same electronic device.

In other applications, on the other hand, the antennas of one of the sets of antennas correspond respectively to different electronic devices, i.e. to different users: this is the case, for example, of MU-MIMO systems (for "Multi User-Multiple-Input Multiple-Output").

Here we consider the case where the transmission antennas $T_1, \ldots, T_{Nt}$ are connected to a control unit U equipped in particular with a processor P and a memory M'.

The communication channel C is modeled by a model vector h comprising Nd elements, each element being a complex-valued function $h_{i,j,k}$ having Np real parameters and descriptive of the transmission from the $j^{th}$ transmitting antenna $T_j$ to the $i^{th}$ reception antenna $R_i$ on the $k^{th}$ sub-carrier (the system using Nf sub-carriers). We therefore have: Nd=Nt·Nr·Nf.

We note $\theta_1, \ldots, \theta_{Np}$ the Np real parameters and $\theta$ the Np-tuple formed of these real parameters.

It is considered here that the model vector h is differentiable with respect to its Np parameters (that is to say that each one of the functions $h_{i,j,k}$ is differentiable with respect to the Np parameters).

We can thus define a matrix $\Delta(\theta)$ (a priori variable as a function of the parameters $\theta$) as follows:

$$\Delta(\theta) = \left( \frac{\partial h}{\partial \theta_1}(\theta), \ldots, \frac{\partial h}{\partial \theta_{Np}}(\theta) \right).$$

In other words, in this matrix $\Delta(\theta)$, an element $\Delta(\theta)_{p,q}$ in row p and in column q is equal to the value taken, for the values of parameters $\theta$ representing the current state of the communication channel C, by the partial derivative, with respect to the $q^{th}$ parameter $\theta_q$ of the plurality of parameters, of the function $h_p$ situated in the $p^{th}$ position in the model vector h.

In the following, we are interested in the real vector space $v_\theta$ defined as follows:

$v_\theta = \{\Delta(\theta)X, X \in \mathbb{R}^{Np}\}$

That is, $v_\theta$ is the real vector space that is the image of the matrix $\Delta(\theta)$.

We recall that a real vector space is a vector space over the field of real numbers (that means a vector space constructed by means of real-valued scalars).

By definition, the vector space $v_\theta$ corresponds to all potential directions of variation of the model of the communication channel C due to infinitesimal variations of the values of parameters $\theta$.

A description will now be given with reference to FIG. 2 of a method of determining and transmitting a pilot sequence in accordance with the invention.

This method is for example implemented in the context of FIG. 1.

Figure 2:
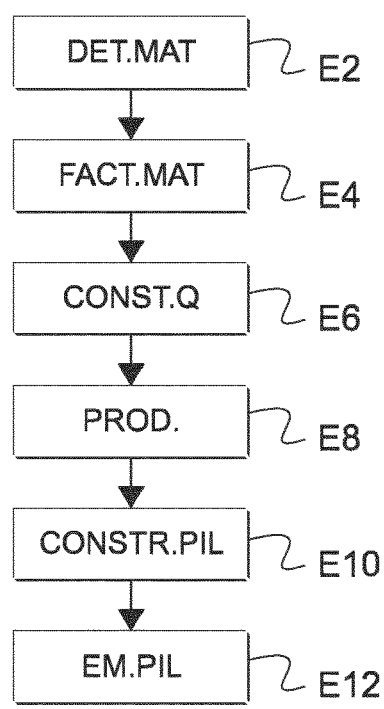
FIG. 2 is a flowchart showing the main steps of an example of a method according to the invention.

In this context, the memory M' stores computer program instructions designed to implement the method of FIG. 2 when these instructions are executed by the processor P. The processor P thus implements each of the steps E2 to E12 described below.

The various handled values and data (in particular the matrix $\Delta(\theta)$ already mentioned and the other matrices handled during the process of FIG. 2) can for example be stored in the memory M'.

The method of FIG. 2 begins with a step E2 of determining the elements $\Delta(\theta)_{p,q}$ of the matrix $\Delta(\theta)$.

Indeed, when at least one of the functions $h_{i,j,k}$ is non-linear with respect to at least one of the parameters $\theta$, at least one of the elements of the matrix $\Delta(\theta)$ is not constant, but variable depending on the operating conditions (that means depending on the parameters $\theta$), and must therefore be determined according to these operating conditions.

Thus, if a function $h_p$ located in the $p^{th}$ position in the model vector h is not linear with respect to the $q^{th}$ real parameter $\theta_q$, the element $\Delta(\theta)_{p,q}$ of the matrix is determined at the step E2, for example on the basis of an estimate of the parameters $\theta$ (or of a subset of the parameters $\theta$) representing the current state of the communication channel C. Such an estimate can be determined beforehand according to measurements carried out in communication channel C and/or previous exchanges in communication channel C.

At least in this case, the element $\Delta(\theta)_{p,q}$ is determined as follows:

$$\Delta(\theta)_{p,q} = \frac{\partial h_p}{\partial \theta_q}(\theta).$$

The method of FIG. 2 continues with a step E4 of factorization of matrix $\Delta(\theta)$ in the form of the product of an R-orthogonal matrix U and an upper triangular matrix R with real values, that means the determination of a matrix U with Nd rows and Np columns and of an upper triangular matrix R with real values with Np rows and Np columns such that:

$\Delta(\theta) = UR$.

We recall that the matrix U is R-orthogonal if and only if $\text{Re}\{U^H U\}$ is a diagonal matrix, where $\text{Re}\{.\}$ is the real part operator and $.^H$ is the conjugate transposed operator.

In the example described here, a R-orthonormal matrix U is used, that is to say such that: $\text{Re}\{U^H U\} = \text{Id}_{Np}$, where $\text{Id}_{Np}$ is the identity matrix with Np rows and Np columns.

The method of FIG. 2 then comprises a step E6 of construction of a R-orthogonal (here R-orthonormal) matrix Q with real values and whose columns form a basis of eigenvectors for the matrix $-\text{Im}\{U^H U\}^2$.

The method of FIG. 2 continues with a step E8 of calculating a matrix V equal to the product of the matrix U and the matrix Q: $V = UQ$.

By construction, the columns of the matrix V form an R-orthogonal basis (here an R-orthonormal basis) of the vector space $v_\theta$, within which the vectors can be grouped by two such that two vectors of two different groups are C-orthogonal.

Indeed, using the theorem referenced 8.16 in the book "Linear Algebra", by W H Greub, Springer Science & Business Media, 1975, vol. 23, the matrix $\text{Im}\{U^H U\}$ being antisymmetric (because $U^H U$ is Hermitian) we can write:

$$Q^T \text{Im}\{U^H U\} Q = \begin{pmatrix} 0 & -c_1 & & & \\ c_1 & 0 & \cdots & & \\ & & \ddots & 0 & -c_k \\ & & & c_k & 0 \end{pmatrix} = \Gamma$$

where $c_1^2, c_2^2, \ldots, c_k^2$ are the eigenvalues (of multiplicity 2) of the matrix $-\text{Im}\{U^H U\}^2$ (determined in step E6 during the construction of the matrix Q) and we therefore have:

$V^H V = Q^T U^H U Q = \text{Id}_{Np} + j\Gamma$ ($.^T$ being the transposed operator).

In other words, if Np is even, by writing the matrix V in the form:

$V = (v_1, w_1, \ldots, v_{Np/2}, w_{Np/2})$, we have: $v_m^H v_n = \delta_{m,n}, w_m^H w_n = \delta_{m,n}$ and $v_m^H w_n = -\delta_{m,n} j c_m$, where $\delta_{m,n} = 0$ if $m \neq n$, $\delta_{m,n} = 1$ if $m = n$, and $c_m$ is a coefficient equal to the square root of the $m^{th}$ eigenvalue of the matrix $-\text{Im}\{U^H U\}^2$ (see above in step E6).

If Np is odd, the matrix V can be written in the form:

$V = (v_1, w_1, \ldots, v_\varepsilon, w_\varepsilon, v_{\varepsilon+1})$, where $\varepsilon$ is the integer part of Np/2,
and in this case we also have: $v_m^H v_n = \delta_{m,n}$, $w_m^H w_n = \delta_{m,n}$ and $v_m^H w_n = -\delta_{m,n} j c_m$.

As a reminder, two vectors x and y are R-orthogonal if $\text{Re}\{x^H y\} = 0$ and C-orthogonal if $x^H y = 0$.

The method of FIG. 2 can thus continue with a step E10 of construction of the pilot vectors $\pi_i$ by means of the orthogonal basis determined in step E8, by grouping the orthogonal vectors of the orthogonal basis in pairs ($v_i, w_i$ according to the above notations) and producing, for each pair comprising a first vector $v_i$ and a second vector $w_i$, a pilot vector $\pi_i$ by summing the first vector $v_i$ and the product of the second vector $w_i$ by an imaginary number (here the imaginary unit j). Here precisely, the pilot vector $\pi_i$ is built as follows (for i integer between 1 and Np/2):

$$\pi_i = \left(\sqrt{\frac{P}{\gamma}}\right)\left(\frac{v_i + jw_i}{(1 + c_i)^{\frac{3}{4}}}\right),$$

where P is the power of the transmitted pilot sequence and where $$\gamma = 2\sum_{l=1}^{Np/2} \frac{1}{\sqrt{1 + c_l}}.$$

When Np is odd, step E10 further comprises the production of an additional pilot vector $\pi_{\varepsilon+1}$ collinear with a vector $v_{\varepsilon+1}$ (not grouped with another vector of the orthogonal basis). We take for example:

$\pi_{\varepsilon+1} = v_{\varepsilon+1}$.

The method of FIG. 2 then comprises a step E12 of transmission in the communication channel C, by all ones of the transmission antennas $T_1, T_{Nt}$, of the pilot sequence formed of the pilot vectors $\pi_i$ constructed at the step E10 (the processor P controlling here in practice the transmission of this pilot sequence).

These pilot vectors $\pi_i$ are optimal in the sense that they minimize the variance of any unbiased estimator (expressed for example by the Cramér-Rao bound) and where the pilot sequence formed of these pilot vectors $\pi_i$ is of minimum length.

A demonstration of the optimal character of these vectors $\pi_i$ is given below in the appendix.

Figure 3:
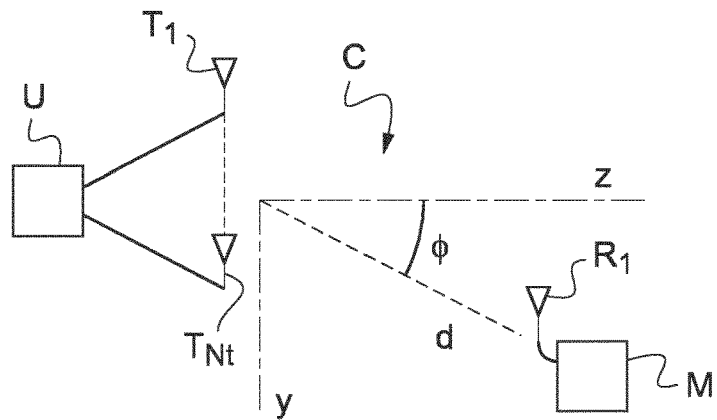
FIG. 3 shows a particular context in which the invention can be implemented.

FIG. 3 illustrates a particular context in which the invention can be implemented.

This is a particular case of the context illustrated in FIG. 1, in which the number Nr of reception antennas is equal to 1 (Nr=1). In addition, a single subcarrier is used so that Nf=1.

Here, the set of transmitting antennas $T_1, \ldots, T_{Nt}$ and of the control unit U form a base station BS of a cellular telecommunications network.

In the example described here, the set of transmitting antennas $T_1, \ldots, T_{Nt}$ is a uniform linear antenna array (or ULA for "Uniform Linear Array").

A mobile terminal M is equipped with the reception antenna $R_1$.

As illustrated in FIG. 3, the mobile terminal M is positioned in a direction d forming an azimuth angle $\phi$ with respect to a reference direction z related to the center of mass (in English: "centroid") of the antenna array $T_1, \ldots, T_{Nt}$.

By modeling the communication channel C by a single physical path between the mobile terminal M and the base station BS, the model vector $h(\theta)$ can be written:

$h(\theta) = \beta e(\phi)$, where β is a complex gain and e(ϕ) a steering vector linked to the antenna array $T_1, \ldots, T_{Nt}$, the real parameters θ of the model vector being thus: (Re{β}, Im{β}, ϕ).

If we note $a_i$ the vector designating the position of the antenna i with respect to the center of mass of the antenna array and u(ϕ) the unit vector oriented along the above-mentioned direction d, the steering vector e(ϕ) is:

$$e(\Phi) = \frac{1}{\sqrt{N_t}}\left(e^{-j\frac{2\pi}{\lambda}a_1.u(\Phi)}, \ldots, e^{-j\frac{2\pi}{\lambda}a_{Nt}.u(\Phi)}\right)^T =$$

$$\frac{1}{\sqrt{N_t}}\left(e^{-j\frac{2\pi}{\lambda}(a_1)_y \sin\Phi}, \ldots, e^{-j\frac{2\pi}{\lambda}(a_{Nt})_y \sin\Phi}\right)^T$$

where λ is the wavelength of the electromagnetic wave used and where $(a_i)_y$ is the component of the vector $a_i$ along the y axis (vertical axis in FIG. 3), the azimuth angle ϕ being defined in the plane comprising the aforementioned z and y axes.

Figure 4:
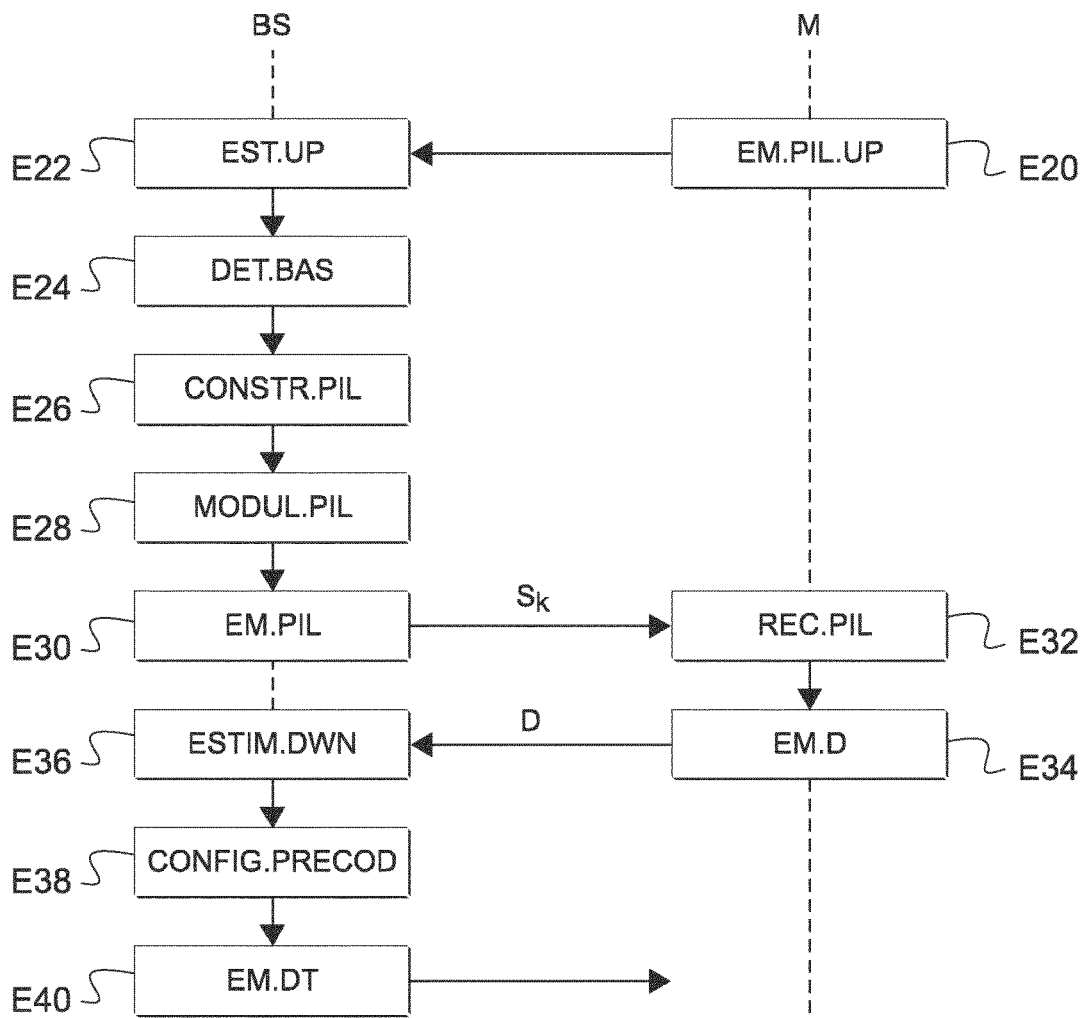
FIG. 4 is a flowchart showing the main steps of an example of a method implemented in the context of FIG. 3.

We will now describe with reference to FIG. 4 an example of a channel estimation method which can be implemented in the context of FIG. 3.

It is also considered that the communication system used (here comprising the base station BS and the mobile terminal M) uses a duplex communication technique with distinct frequencies (or FDD for "Frequency Division Duplex") according to which the uplink and the downlink use carriers of different frequencies.

In this case, a channel estimation for the uplink and a channel estimation for the downlink are carried out, as now explained.

The method of FIG. 4 begins at step E20 in which a predetermined pilot sequence is transmitted in the communication channel C on the uplink, that is to say here transmitted by the mobile terminal M to the base station BS.

Note that, in the embodiment described here, the pilot sequence transmitted in step E20 is not determined in accordance with the teachings of the invention, but according to standard techniques in the literature.

As a variant, the predetermined pilot sequence could be sent in step E20 by a telecommunications device other than the mobile terminal M (for example by a device dedicated to channel estimation).

The base station BS thus receives a series of symbols corresponding to the predetermined pilot sequence and can then perform in step E22 an estimation of the uplink channel.

By using a channel model for the uplink, this channel estimation step E22 comprises the determination of parameter values of this channel model which best correspond to the symbols received (on the basis of a maximum likelihood criterion), that is to say which maximize the probability of obtaining the symbols received after transmission of the predetermined pilot sequence.

If the uplink channel is modeled using a model of the type:

$g(\phi, \alpha) = \alpha e(\phi)^*$ in the case of FIG. 3, where α is a complex gain, e(ϕ) the steering vector already mentioned and .* the conjugate operator, the channel estimation step E22 makes it possible to determine an estimate of the parameters α and ϕ.

The method of FIG. 4 can then perform downlink channel estimation in accordance with the teachings of the invention, as now described.

The base station BS (playing in the following the role of transmitter) thus determines in step E24 an orthogonal basis of the real vector space ve which is the image of the matrix Δ(θ).

The model vector being written here: h(θ)=βe(ϕ) as already indicated, with the real parameters: Re{β}, Im{β} and ϕ, we have in the present case:

$$\Delta(\theta) = \left(e(\Phi), je(\Phi), \beta\frac{\partial e(\Phi)}{\partial \Phi}\right).$$

Due to the use of the center of mass of the antenna array as a reference, we have:

$$e(\Phi)^H \frac{\partial e(\Phi)}{\partial \Phi} = 0$$

(that is to say that these vectors are C-orthogonal between them and therefore a fortiori R-orthogonal between them).

The orthogonal basis of the R-vector space ye determined by the base station BS can therefore be of the form $$(v_1, w_1, v_2) = \left(e(\Phi), -je(\Phi), \overline{\frac{\partial e(\Phi)}{\partial \Phi}}\right) \text{ where } \overline{\frac{\partial e(\Phi)}{\partial \Phi}}$$

is the vector of norm 1 and collinear with $$\frac{\partial e(\Phi)}{\partial \Phi} = \frac{-j2\pi}{\lambda\sqrt{N_t}}\cos\Phi\left((a_1)_y e^{-j\frac{2\pi}{\lambda}(a_1)_y \sin\Phi}, \ldots, (a_{Nt})_y e^{-j\frac{2\pi}{\lambda}(a_{Nt})_y \sin\Phi}\right)^T.$$

These vectors $v_1, w_1, v_2$ can be determined in practice by means of the value of the parameter ϕ estimated in step E22 thanks to the channel estimation in the uplink.

The base station BS can then construct pilot vectors in step E26 by grouping the vectors $v_1$ and $w_1$, and by producing:

a first vector $\pi_1$ obtained by summation of the vector $v_1$ and the product of the vector $w_1$ by the imaginary unit j, precisely:

$$\pi_1 = \left(\sqrt{\frac{P}{\sqrt{2}+1}}\right)\left(\frac{v_1 + jw_1}{2^{\frac{3}{4}}}\right) = \left(\sqrt{\frac{P}{\sqrt{2}+1}}\right)\left(2^{\frac{1}{4}}e(\Phi)\right)$$

a second vector $\pi_2$ collinear with vector $v_2$, precisely $$\pi_2 = \left(\sqrt{\frac{P}{\sqrt{2}+1}}\right)v_2 = \left(\sqrt{\frac{P}{\sqrt{2}+1}}\right)\frac{\partial e(\Phi)}{\partial \Phi}$$

where P is as already indicated the total power of the pilot sequence formed of these pilot vectors $\pi_1, \pi_2$.

As already indicated, the pilot sequence formed of these pilot vectors $\pi_1, \pi_2$ is optimal in terms of estimation (minimum variance) and length (minimum length).

The pilot vectors $\pi_1, \pi_2$ can then be transmitted in the communication channel C, here by the transmission antennas $T_1, \ldots, T_{Nt}$, as described now.

For each transmitting antenna $T_k$, the control unit U of the base station BS performs in step E28 a modulation of the pilot symbols $\pi_{1,k}$, $\pi_{2,k}$ (that is to say the elements respectively located in the $k^{th}$ position in the pilot vectors $\pi_1$, $\pi_2$) in order to obtain signals $S_k$ to be transmitted. In practice, such a modulation is for example obtained, for each pilot symbol $\pi_{1,k}$, $\pi_{2,k}$, by applying the pilot symbol concerned to a carrier, precisely by applying to this carrier a gain corresponding (or equal) to the modulus of the pilot symbol concerned and a phase shift corresponds to (or equal to) the argument of the pilot symbol concerned.

In certain embodiments, data symbols (representing data to be transmitted) can be multiplexed with the pilot symbols before the modulation step E28.

The control unit U then controls the transmission, by each communication antenna $T_k$, of the corresponding signals $S_k$ determined in step E30.

The transmitted signals $S_k$ are received (with modifications due to the transmission in the communication channel C) by the mobile terminal M (playing the role of receiver here) via the reception antenna $R_1$ in step E32.

The mobile terminal M then transmits in return (that is to say to the base station BS, here at step E34) channel state data D (or CSI for "Channel State Information") determined (by processing within the mobile terminal M) on the basis of the signals received (in practice: on the basis of the pilot symbols received, obtained by demodulation of the signals received).

The base station BS receives the channel state data D and can thus perform in step E36 an estimation of the downlink channel, that is to say determine the values of the parameters of the channel model (shown here by the model vector $h(\theta)$) that best fit the channel state data D (based on a maximum likelihood criterion), that means that maximize the probability of obtaining the D-channel status data after transmission of the pilot sequence in step E30. For example, use can be made of an algorithm based on a sparse representation of the channel, as described for example in the article "*Compressed channel sensing: A new approach to estimating sparse multipath channels*", by Bajwa, W. U., Haupt, J., Sayeed, A. M., & Nowak, R. in Proceedings of the IEEE, 98(6), 1058-1076 (2010).

In the case described here, the current values of the parameters $\beta$ and $\phi$ are thus obtained. Note that the current value of the parameter $\phi$ is an update of the value of the same parameter determined in step E22. This update makes it possible to follow the evolution of this parameter in real time and thus to obtain a more relevant estimate of this parameter.

The control unit U of the base station BS can then configure in step E38 a precoding module (equipping the base station BS) according to the values of the parameters determined in step E36. On this subject, reference can be made to the article "*Spatially sparse precoding in millimeter wave MIMO systems*", by El Ayach, O., Rajagopal, S., Abu-Surra, S., Pi, Z., & Heath, R. W. in IEEE transactions on wireless communications, 13(3), 1499-1513 (2014).

The base station BS thus transmits data to the mobile terminal M (by means of its transmission antennas $T_1, \ldots, T_{Nt}$) after processing these data by the precoding module (configured at step E38). This transmission is optimized thanks to the channel estimation carried out as explained above.

APPENDIX: PROOF OF OPTIMAL CHARACTER

We demonstrate below the optimal character of the pilot sequence $\pi_1, \ldots, \pi_{Np/2}$ proposed above in the case where the number Np of parameters is even (the demonstration in the case where the number Np is odd being similar).

We use the Fisher information matrix $I(\theta,M)$ given (in the presence of Gaussian noise of variance $\sigma^2$) by the Slepian-Bangs formula:

$$I(\theta, M) = \frac{2}{\sigma^2}\text{Re}\left\{\frac{\partial h}{\partial \theta}MM^H\frac{\partial h}{\partial \theta}\right\} = \frac{2}{\sigma^2}\text{Re}\{\Delta(\theta)^H MM^H \Delta(\theta)\}$$

where M is the observation matrix whose columns correspond to the vectors emitted in the communication channel C (the second formulation using only the form $\Delta(\theta)$ given above for the matrix concerned).

The Fisher information matrix $I(\theta,M)$ quantifies the amount of information about the parameters $\theta$ that can be obtained upon receipt of the vectors defined by the columns of the observation matrix M.

On this subject, reference can be made to the article "*On the Fisher information matrix for multivariate elliptically contoured distributions*", by O. Besson and Y. I. Abramovich, in IEEE Signal Processing Letters, vol. 20, no. 11, pp. 1130-1133, 2013.

The matrix R defined above being with real values, we can write:

$$I(\theta, M) = \frac{2}{\sigma^2} R^T \text{Re}\{U^H MM^H U\} R$$

The Cramér-Rao bound then has the expression (see for example the article "*A Cramér-Rao lower bound for complex parameters*", by A. Van den Bos in IEEE Transactions on Signal Processing, 42(10), 1994):

$$CRB(\theta,M) = Tr[\Delta(\theta)I(\theta,M)^{-1}\Delta(\theta)^H]$$

or, by replacing the expression of the Fisher information matrix $I(\theta,M)$ given above and simplifying:

$$CRB(\theta, M) = \frac{\sigma^2}{2} Tr[\text{Re}\{U^H MM^H U\}^{-1}].$$

Since the Q matrix defined above is real-valued and R-orthogonal and V=UQ, the Cramér-Rao bound can be expressed as:

$$CRB(\theta, M) = \frac{\sigma^2}{2} Tr[\text{Re}\{V^H MM^H V\}^{-1}].$$

Since, for any positive semi-definite symmetric matrix A, we have:
$(A^{-1})_{i,i} \geq 1/a_{i,i}$ (where $a_{i,i}$ is the diagonal element in row i and column i of the matrix A),
we can write:

$$Tr[\mathcal{Re}\{V^H MM^H V\}^{-1}] \geq \sum_{k=1}^{\frac{N_p}{2}} \frac{1}{\|M^H v_k\|_2^2} + \frac{1}{\|M^H w_k\|_2^2};$$

with an equality if and only if the matrix $\text{Re}\{V^H MM^H V\}$ is diagonal.

To continue, we define:

$$\tilde{u}_k^+ = \frac{1}{\sqrt{2(1+c_k)}}(v_k + jw_k)$$

and $$\tilde{u}_k^- = \frac{1}{\sqrt{2(1+c_k)}}(v_k + jw_k)$$

which are unit vectors and, for a given k, C-orthogonal to each other.

These vectors make it possible to write:

$$\|M^H v_k\|_2^2 = \frac{1}{2}\left[(1+c_k)\|M^H \tilde{u}_k^+\|_2^2 + (1-c_k)\|M^H \tilde{u}_k^-\|_2^2 + \sqrt{1-c_k^2}\,\mathcal{R}e\,\{(\tilde{u}_k^+)^H MM^H \tilde{u}_k^-\}\right],$$

and $$\|M^H w_k\|_2^2 = \frac{1}{2}\left[(1+c_k)\|M^H \tilde{u}_k^+\|_2^2 + (1-c_k)\|M^H \tilde{u}_k^-\|_2^2 - \sqrt{1-c_k^2}\,\mathcal{R}e\,\{(\tilde{u}_k^+)^H MM^H \tilde{u}_k^-\}\right].$$

To simplify the expressions, we further define:

$$P_k^+ \triangleq \|M^H \tilde{u}_k^+\|_2^2$$

$$P_k^- \triangleq \|M^H \tilde{u}_k^-\|_2^2$$

$$d_k \triangleq \sqrt{1-c_k^2}\,\mathfrak{R}\{(\tilde{u}_k^+)^H MM^H \tilde{u}_k^-\}$$

which allows to write:

$$\sum_{k=1}^{\frac{N_p}{2}} \frac{1}{\|M^H v_k\|_2^2} + \frac{1}{\|M^H w_k\|_2^2} =$$

$$\sum_{k=1}^{\frac{N_p}{2}} \frac{2}{(1+c_k)P_k^+ + (1-c_k)P_k^- + d_k} + \frac{2}{(1-c_k)P_k^- + (1+c_k)P_k^+ - d_k} \geq$$

$$\sum_{k=1}^{\frac{N_p}{2}} \frac{4}{(1-c_k)P_k^- + (1+c_k)P_k^+ - d_k},$$

(the last inequality coming from the fact that $1/(a+b)+1/(a-b) \geq 2/a$ by convexity of the inverse function on the set of positive reals).

The last inequality becomes an equality if and only if the value $d_k$ (defined above) is zero.

As a summary we have:

$$CRB(\theta, M) = \frac{\sigma^2}{2} \sum_{k=1}^{\frac{N_p}{2}} \frac{4}{(1-c_k)P_k^- + (1+c_k)P_k^+}$$

if and only if $Re\{V^H MM^H V\}$ is diagonal and, for all k, $$\mathfrak{R}\{(\tilde{u}_k^+)^H MM^H \tilde{u}_k^-\} = 0$$

We have moreover $$\|M\|_F^2 = Tr[MM^H] \geq \sum_{k=1}^{\frac{N_p}{2}} P_k^+ + P_k^-$$

with an equality if and only if the complex vector space image of the matrix M is included in the complex vector space generated by the set of vectors $$\{\tilde{u}_k^+, \tilde{u}_k^-\}_{k=1}^{\frac{N_p}{2}}.$$

The optimization problem that we seek to solve is therefore bounded from below by the following simpler problem $$\underset{P_k^+, P_k^-, k=1,\ldots,\frac{N_p}{2}}{\text{minimize}} \sum_{k=1}^{\frac{N_p}{2}} \frac{4}{(1-c_k)P_k^- + (1+c_k)P_k^+}$$

respecting the power condition:

$$\sum_{k=1}^{\frac{N_p}{2}} P_k^+ + P_k^- = P.$$

Given the form of the terms of the sum to be minimized, the optimum is reached when, for all k, $P_k^-$ is zero. We are therefore in fact trying to solve the above problem with, for all k, $$P_k^- = 0.$$

By using the method of Lagrange multipliers, we obtain the following optimal powers:

$$(P_k^+)_{opt} = \frac{P}{\sqrt{1+c_k} \sum_{j=1}^{\frac{N_p}{2}} \frac{1}{\sqrt{1+c_j}}}$$

and the optimal value of the optimization problem is:

$$\sum_{k=1}^{\frac{N_p}{2}} \frac{4}{(1+c_k)(P_k^+)_{opt}} = \frac{4}{P}\left(\sum_{k=1}^{\frac{N_p}{2}} \frac{1}{\sqrt{1+c_k}}\right)^2$$

It is reached for the observation matrix $M_{opt}$ defined by:

$$M_{opt} = \left(\sqrt{(P_1^+)_{opt}}\,\tilde{u}_1^+, \ldots, \sqrt{(P_{\frac{N_p}{2}}^+)_{opt}}\,\tilde{u}_{\frac{N_p}{2}}^+\right)$$

for which we have:
$d_k$ is null for all k
$Re\{V^H M_{opt} M_{opt}^H V\}$ is diagonal $P_k^+ = (P_k^+)_{opt}$ for all k $\|M_{opt}\|_F^2 = P$

The invention claimed is:
1. A method of determining a pilot sequence including pilot vectors to be transmitted in a communication channel modeled by a model vector including at least one complex-valued function which is variable as a function of a plurality of real parameters and is descriptive of a transmission from a transmitting antenna to a receiving antenna through the communication channel, the method comprising:
determining an orthogonal basis of a real vector space that is an image of a matrix having, respectively as col- umns, the partial derivatives of the model vector with respect to the different real parameters; and constructing the pilot vectors using the determined orthogonal basis, by grouping the orthogonal vectors of the orthogonal basis in at least one pair and by producing, for each of the at least one pair comprising a first vector and a second vector, a pilot vector by summation of the first vector and a product of the second vector by an imaginary number.

2. The method according to claim 1, further comprising determining at least one of the elements of said matrix based on at least one previously determined value of one of said different real parameters and representing a current state of the communication channel.

3. The method according to claim 1, wherein said matrix comprises a number of rows equal to a number of elements forming the model vector, and a number of columns equal to a number of real parameters in the plurality of real parameters, and wherein any matrix element in row p and column q in said matrix is equal to a value taken, for values of the plurality of real parameters representing a current state of the communication channel, by a partial derivative, with respect to a $q^{th}$ real parameter of the plurality of real parameters, of a function located in a $P^{th}$ position in the model vector.

4. The method according to claim 1, wherein the determining said orthogonal basis of the real vector space comprises: factoring said matrix in a form of a product of an R-orthogonal matrix U and a real-valued upper triangular matrix.

5. The method according to claim 4, wherein the determining said orthogonal basis of the real vector space comprises:

constructing a matrix Q whose columns form an eigenvector basis for a matrix $-\text{Im}\{U^H U\}^2$, and calculating a product of the R-orthogonal matrix U and the matrix Q.

6. The method according to claim 4, wherein the determining said orthogonal basis of the real vector space comprises: determining at least one coefficient equal to a square root of an eigenvalue of a matrix $-\text{Im}\{U^H U\}^2$, and wherein the constructing said pilot vectors uses said at least one coefficient to produce one of said pilot vectors.

7. The method according to claim 1, wherein the constructing the pilot vectors comprises:

when a number of orthogonal vectors in the orthogonal basis is odd, producing a pilot vector colinear with one of said number of orthogonal vectors.

8. The method according to claim 1, wherein said function is non-linear with respect to at least one parameter among said plurality of real parameters.

9. The method according to claim 1, wherein the model vector is a product of a complex gain and a steering vector that is variable as a function of an angle identifying a position of the receiving antenna relative to the transmitting antenna, said plurality of real parameters being a real part of the complex gain, an imaginary part of the complex gain and said angle.

10. The method according to claim 1, wherein elements of the model vector are different complex-valued functions that are variable depending on the plurality of real parameters and respectively descriptive of transmissions between distinct pairs of the transmitting antenna and the corresponding receiving antenna.

11. A channel estimation method between a transmitter and a receiver, the method comprising:

determining the pilot vectors in accordance with the method according to claim 1; and transmitting the pilot vectors determined in the communication channel.

12. The estimation method according to claim 11, wherein the receiver receives the transmitted pilot vectors and determines channel state data based on the received pilot vectors.

13. The estimation method according to claim 12, wherein the channel state data is transmitted by the receiver to the transmitter, and wherein the transmitter carries out an estimation of at least one value of a parameter of a channel model based on the channel state data.

14. The estimation method according to claim 13, wherein precoding modules of the transmitter are configured according to said at least one estimated value of the parameter of the channel model.

15. A device for determining a pilot sequence including pilot vectors to be transmitted in a communication channel modeled by a model vector including at least one complex-valued function which is variable as a function of a plurality of real parameters and descriptive of a transmission from a transmitting antenna to a receiving antenna through the communication channel, the device comprising at least one processor configured to:

determine an orthogonal basis of a real vector space that is an image of a matrix having, respectively as columns, the partial derivatives of the model vector with respect to the different real parameters; and construct the pilot vectors using the determined orthogonal basis, by grouping the orthogonal vectors of the orthogonal basis in at least one pair and by producing, for each of the at least one pair comprising a first vector and a second vector, a pilot vector by summation of the first vector and a product of the second vector by an imaginary number.

16. A non-transitory computer-readable medium on which are stored instructions to implement the method according to claim 1 when the instructions are executed by a processor.

* * * * *